(12) United States Patent
Tsutsui et al.

(10) Patent No.: US 7,669,761 B2
(45) Date of Patent: Mar. 2, 2010

(54) SALES SHOP SYSTEM

(75) Inventors: Toshiyuki Tsutsui, Tokyo (JP);
Masataka Itakura, Yokohama (JP);
Tomohiro Hamada, Kawasaki (JP);
Akihito Itou, Yokohama (JP); Kazuma Kurata, Tokyo (JP)

(73) Assignee: Hitachi, Ltd., Tokyo (JP)

( * ) Notice: Subject to any disclaimer, the term of this patent is extended or adjusted under 35 U.S.C. 154(b) by 1161 days.

(21) Appl. No.: 11/259,260

(22) Filed: Oct. 27, 2005

(65) Prior Publication Data

US 2006/0097045 A1 May 11, 2006

(30) Foreign Application Priority Data

Nov. 5, 2004 (JP) ............................. 2004-321453

(51) Int. Cl.
*G06K 15/00* (2006.01)
(52) U.S. Cl. ...................................... 235/383; 235/385
(58) Field of Classification Search ................ 235/383, 235/385, 487, 492
See application file for complete search history.

(56) References Cited

U.S. PATENT DOCUMENTS

| 6,477,521 | B1 | 11/2002 | Kumomura | |
| 6,624,843 | B2* | 9/2003 | Lennon | 348/61 |
| 2002/0010622 | A1* | 1/2002 | Okamoto et al. | 705/10 |
| 2002/0113122 | A1* | 8/2002 | Brikho | 235/379 |
| 2003/0217005 | A1* | 11/2003 | Drummond et al. | 705/43 |

* cited by examiner

*Primary Examiner*—Daniel St.Cyr
(74) *Attorney, Agent, or Firm*—Antonelli, Terry, Stout & Kraus, LLP.

(57) ABSTRACT

Conventionally, to acquire specific information of a customer, acquisition of the information is only possible by using information such as a bank account number owned by the customer, and further it is not possible to present information beneficial to the customer unless information owned by the customer is acquired from the customer. More specifically, there is a problem in that much time is necessary for a customer or a system operator to input such information.

To solve the above-stated problem, the present invention outputs information associated with a customer by using biometric information including a face image. More specifically, biometric information is acquired from a user of a first terminal unit included in a plurality of terminal units, and information associated with an operation made by the user is identified. Then, when the user is going to use a second terminal unit (or when the second terminal unit executes processing of information on the user based on inputs by a third party, etc.), biometric information is acquired from the user, and information that is identified by an operation made on the first terminal unit is retrieved for output by using the biometric information.

15 Claims, 7 Drawing Sheets

FIG. 2

DISPLAY CONTENT STORING TABLE (2000)

| FACE IMAGE NO. (2100) | DISPLAY CONTENT (2200) |
|---|---|
| 001 | HOUSING LOAN |
| 002 | FOREIGN CURRENCY DEPOSIT |
| 003 | OPENING OF A NEW BANK ACCOUNT |

FIG. 3

CUSTOMER FACE IMAGE TEMPORARY STORING TABLE (3000)

| FACE IMAGE NO. (3100) | FACE IMAGE CAPTURING TIME (3200) | FACE IMAGE (3300) | BANK ACCOUNT NO. (3400) |
|---|---|---|---|
| 001 | 10:00 | 🙂 | 9884-0998383 |
| 002 | 12:00 | ⬤ | — |
| 003 | 13:00 | 😐 | 9882-1122445 |

FIG. 4

CUSTOMER INFORMATION TABLE 4000

| BANK ACCOUNT NO. 4100 | INFORMATION ON INTEREST 4200 |
|---|---|
| 9884-0998383 | HOUSING LOAN |
| 9882-1122445 | — |
| 9881-0038491 | ORDINARY DEPOSIT IN FOREIGN CURRENCY |

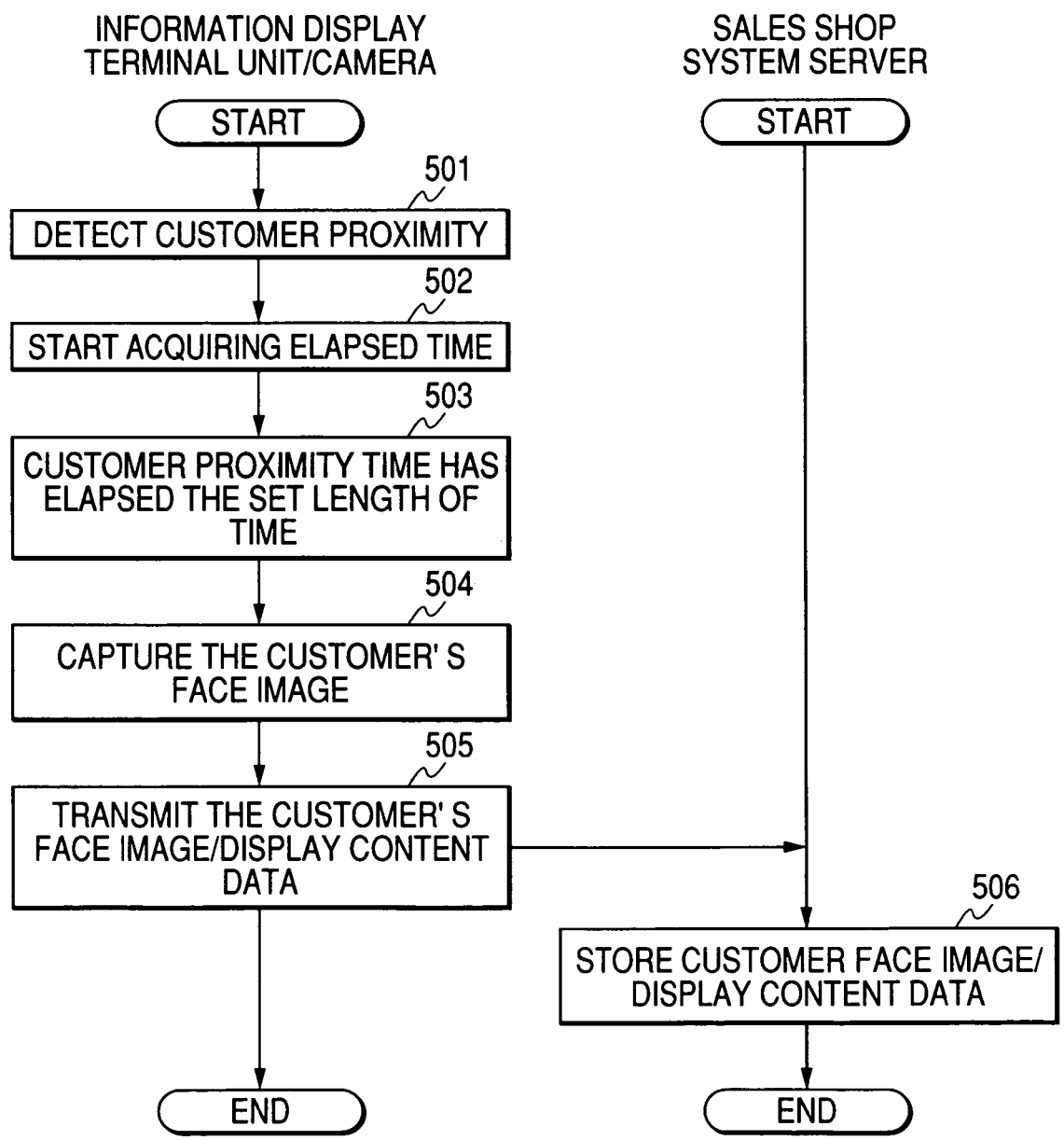

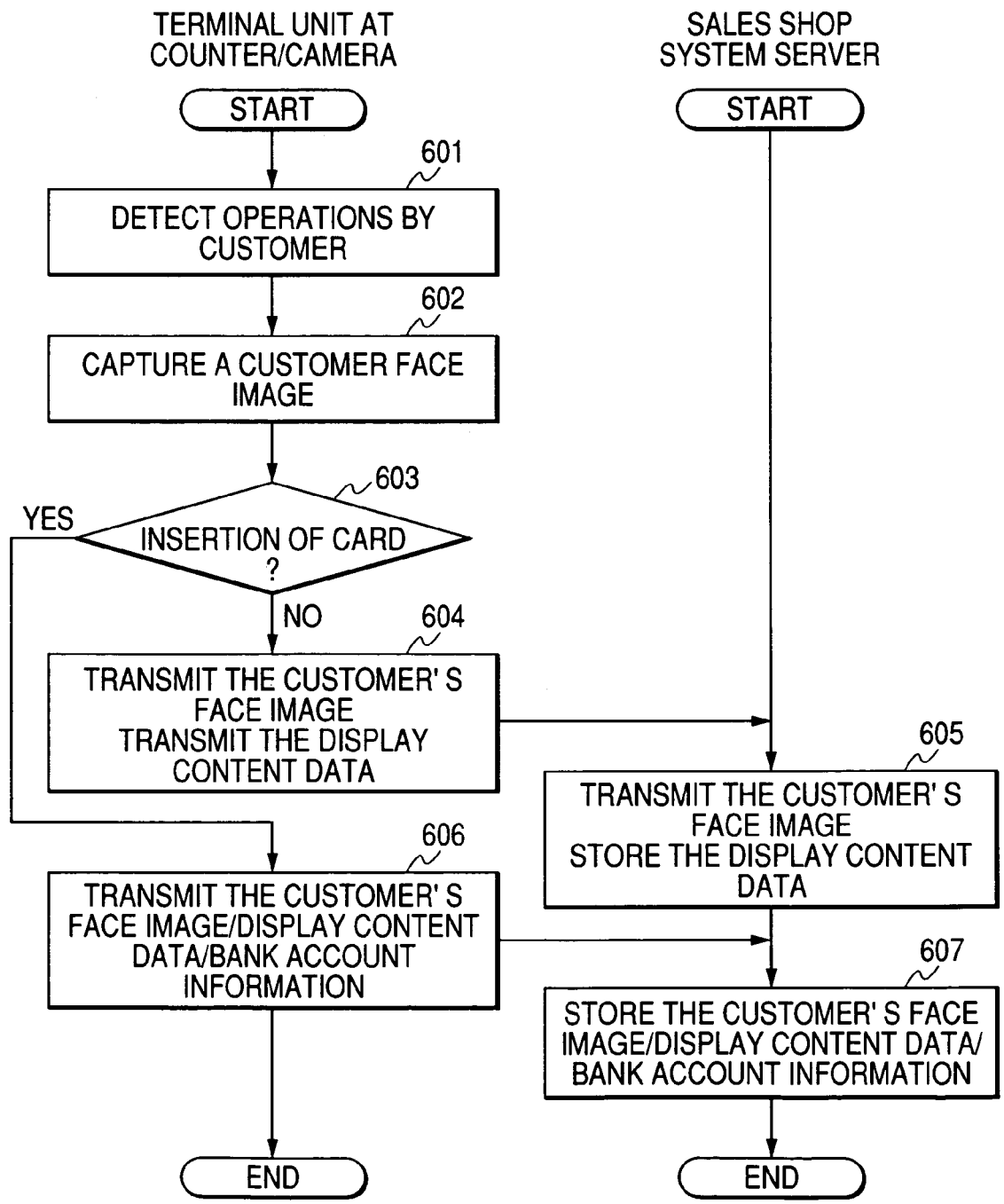

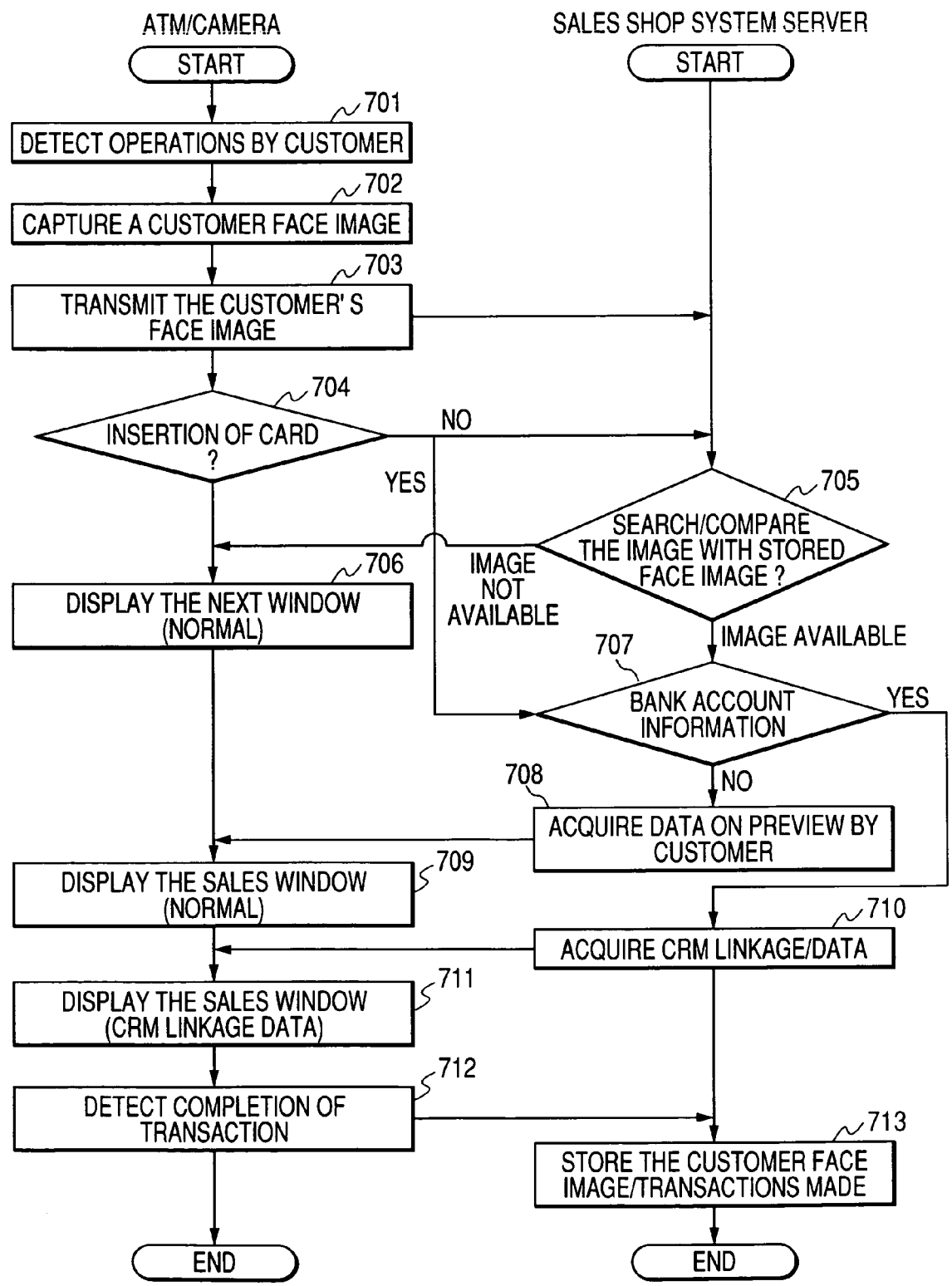

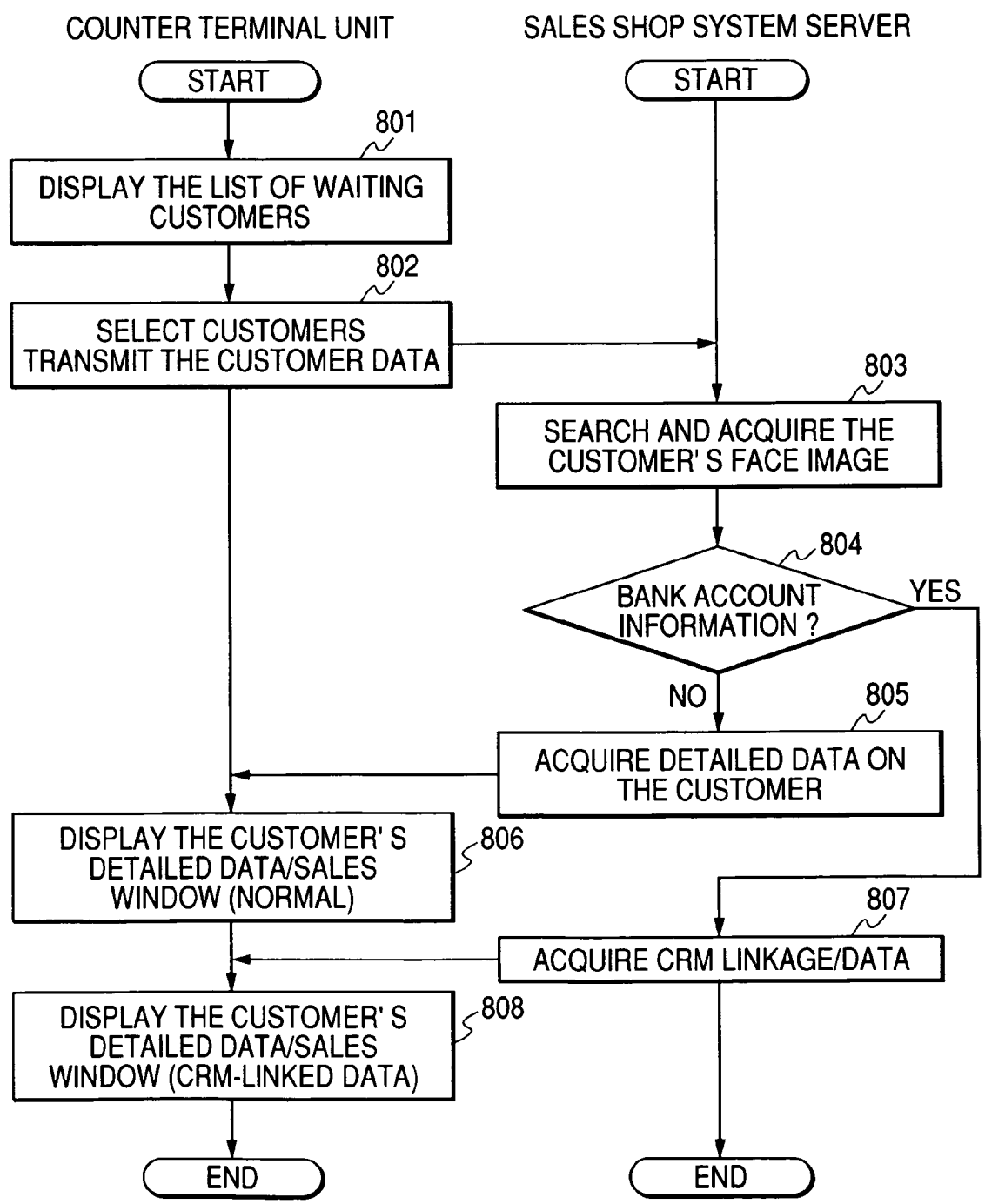

SALES SHOP SYSTEM

CLAIMS OF PRIORITY

The present application claims priority from Japanese application serial no. JP2004-321453, filed on Nov. 5, 2004, the content of which is hereby incorporated by reference into this application.

BACKGROUND OF THE INVENTION

The present invention relates to a sales shop system which realizes work tasks by using a plurality of information processing apparatuses located inside or outside a sales shop, and more specifically, to presentation of display content including merchandise information and advertising information appropriate for each customer.

Conventionally, systems that present merchandise information according to customers include a system described in patent document 1 (U.S. Pat. No. 6,477,521). Patent Document 1 describes a system in which information for identifying a customer is received, attribute information of the customer who is identified by the information is retrieved, and then merchandise information having customer conditions that satisfy the attribute information is output. With such a system, it is possible to rapidly provide merchandise information that matches customer needs.

SUMMARY OF THE INVENTION

However, the system described Patent Document 1 is needed to input information for identifying a customer. For example, to acquire specific information of a customer, acquisition of the information is only possible by using information such as a bank account number owned by the customer, and further it is not possible to present information beneficial to the customer unless information owned by the customer is acquired from the customer. More specifically, the system referred to in Patent Document 1 has a problem in that much time is necessary for a customer or a system operator to input such information. In addition, the problem also causes another problem in that, since it is not possible, when a visitor to the shop is waiting at the lobby, to identify the waiting customer, it is difficult to go on sales activities.

Further, no special attention has been paid to use of information to be received from a customer for transmission of information, and information has been transmitted in one way by using an information display device.

To solve the above-stated problems, the present invention is configured to output information appropriate for each customer by using biometric information including a face image. More specifically, biometric information is acquired from a user of a first terminal unit, and information associated with operations by the user is identified. Then, when the user is going to use a second terminal unit (or when the second terminal unit executes processing of information on the user based on inputs by a third party, etc.), biometric information is acquired from the user, and information that is identified by operations on the first terminal unit is retrieved for output by using the biometric information.

According to the present invention, it is possible to identify merchandise information appropriate for each customer more easily and present the information.

BRIEF DESCRIPTION OF THE DRAWINGS

FIG. 2 is a diagram illustrating an example of a display content storing table according to a preferred embodiment of the present invention;

FIG. 3 is a diagram illustrating an example of a customer face image temporary storing table according to a preferred embodiment of the present invention;

FIG. 4 is a diagram illustrating an example of a customer information table according to a preferred embodiment of the present invention;

FIG. 5 is a diagram illustrating a customer face image acquisition flow (information display terminal unit) in a method for controlling the sales shop system and the information processing apparatus according to a preferred embodiment of the present invention;

FIG. 6 is a diagram illustrating a customer face image acquisition flow (terminal unit at counter) in a method for controlling the sales shop system and the information processing apparatus according to a preferred embodiment of the present invention;

FIG. 7 is a diagram illustrating a sales information display flow (ATM) in a method for controlling the sales shop system and the information processing apparatus according to a preferred embodiment of the present invention; and FIG. 8 is a diagram illustrating a sales information display flow (terminal unit at counter) in a method for controlling the sales shop system and the information processing apparatus according to a preferred embodiment of the present invention.

DESCRIPTION OF THE PREFERRED EMBODIMENTS

Figure 1:
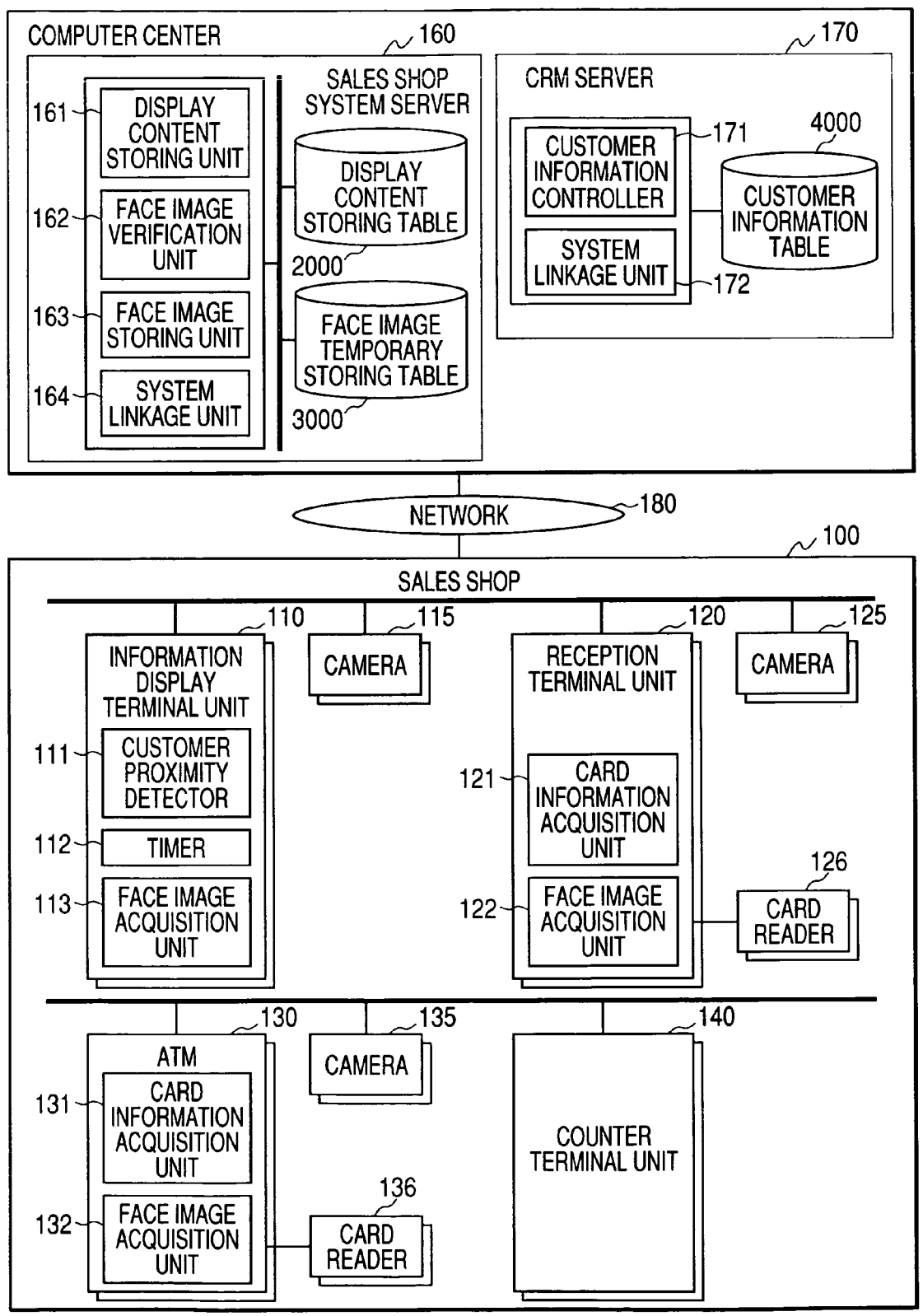
FIG. 1 is a network configuration diagram including a sales shop system and an information processing apparatus according to a preferred embodiment of the present invention.

Hereinafter, preferred embodiments according to the present invention will be described.

FIG. 1 is a diagram illustrating a system configuration of the present invention. As shown in FIG. 1, the system includes a group of terminal units such as information display terminal units 110, reception terminal units 120, ATMs 130, and counter terminal units 140, all of which are in a sales shop 100, a sales shop system server 160, and a CRM server 170. Every terminal unit in the sales shop 100 and a group of the servers are connected to each other via a network 180. The network 180 can be an adequate network.

The sales shop system server 160 includes a display content storing unit 161, a face image storing unit 163, a face image verification unit 162, and a system linkage unit 164. The display content storing unit 161 stores merchandise information that was previewed by a customer on a first information processing apparatus in a sales shop. The face image storing unit 163 acquires a face image of a customer when the customer previewed the merchandise information on a second information processing apparatus in the sales shop and stores the face image. The face image verification unit 162 verifies the face image information that is acquired and stored in the first information processing apparatus and the face image that is acquired by the second information processing apparatus. The system linkage unit 164 establishes linkage with other systems.

The sales shop 100 includes: the information display terminal units 110; customer proximity detectors 111 which detect that a customer has come in proximity to the information display terminal unit 110; timers 112 which, when the customer remains in proximity to the system after being detected, measures the time; face image acquisition units 113 which acquire a face image in the information display terminal unit 110; and cameras 115 which captures a face image of the customer according to an order from the face image acquisition unit 113. The sales shop 100 further includes: the reception terminal units 120; card information acquisition units 121 which acquire card information when the card is inserted into the reception terminal unit 120; face image acquisition units 122 which acquire a face image in the reception terminal unit 120; cameras 125 which capture a face image of the customer according to an order from the face image acquisition unit 122; and card readers 126 which read card information according to an order from the card information acquisition unit 121. The sales shop 100 further includes: the ATMs 130; card information acquisition units 131 which acquire card information when a card is inserted into the ATM 130; face image acquisition units 132 which capture a face image in the ATM 130; cameras 135 which capture a face image of the customer according to an order from the face image acquisition unit 132; and card readers 136 which read card information according to an order from the face image acquisition unit 132; and counter terminal units 140 which are each operated by a clerk when the clerk deals directly with the customer at the counter.

The cameras which capture a face image of a customer according to an order from a face image acquisition unit incorporated in each of the information display terminal unit 110, the reception terminal 120 and the ATM 130 may be integrated with the casing of each of these terminal units. In addition, the cameras which capture a face image of a customer according to an order from, a face image acquisition unit incorporated in each of the information display terminal unit 110, the reception terminal 120 and the ATM 130 output identifiers which are associated with those terminal units, respectively.

Next, tables according to the present invention will be described with reference to FIGS. 2 to 4.

FIG. 2 illustrates a display content storing table 2000 which stores merchandise information that is previewed by a customer on an apparatus in a sales shop, and the table includes a face image number 2100 and display content 2200. In the embodiment, the table is managed by the display content storing unit 161 in the sales shop 100.

FIG. 3 illustrates a customer face image temporary storing table 3000 which stores a face image of a customer, and the table includes a face image number 3100, face image capturing time 3200, a face image 3300 and a bank account number 3400. In the embodiment, the table is managed by the face image storing unit 163 in the sales shop 100 and is acquired by the face image verification unit 162. It is not always necessary that a value is entered for the bank account number 3400.

FIG. 4 illustrates a customer information table 4000 on which information on a product that attracted interest of a customer is stored, and the table includes a bank account number 4100 and information on interest 4200. The information on interest means such information that is assumed necessary for a customer or to attract interest of a customer. In the embodiment, the table is managed by a customer information controller 171 which is in the CRM server 170. However, a change may be made flexibly as to which server manages the table. In addition, items other than the bank account number 4100 may be changed flexibly according to customer information required.

The embodiment is characterized in that the system temporarily stores a face image of a customer that is acquired by a first information processing apparatus in the customer face image temporary storing table 3000, and verifies a face image that is acquired by a second information processing apparatus which is different from the first information processing apparatus, thus enabling presentation of the merchandise information that is previewed by the customer on the first information processing apparatus or information on interest of the customer without acquiring information owned by the customer from the customer. In the embodiment, the display content storing table 2000, the customer face image temporary storing table 3000, and the customer information table 4000 are managed by a database, but the management method thereof can be chosen freely.

The table configuration which is used in the system is as stated above.

Next, processing procedures of the present invention will be described.

Here, processing in the information display terminal unit 110, processing in the reception terminal unit 120, processing in the ATM 130 and processing in the counter terminal unit 140 will be described in details with reference to the flow charts in FIG. 5 to 8.

FIG. 5 illustrates processing wherein, when merchandise information is displayed on the information display terminal unit 110, the system server at sales shop 160 makes changes on the display content storing table 2000 and the customer face image temporary storing table 3000 based on the face image of the customer captured in accordance with the proximity time of the customer along with the merchandise information displayed.

FIG. 6 illustrates processing wherein, when a customer conducts operations on the reception terminal unit 120, the sales shop system server 160 makes changes on the display content storing table 2000 and the customer face image temporary storing table 3000 based on the face image of the customer captured along with information of a card owned by the customer, if acquired.

FIG. 7 illustrates processing wherein, when a customer conducts operations on the ATM 130, if a face image of the customer is captured and information of a card owned by the customer is acquired, the sales shop system server 160 uses both the face image and the card information to search the display content storing table 2000, the customer face image temporary storing table 3000 and the customer information table 4000 for information that the customer previewed on other information processing apparatuses or information on interest of the customer and instructs the ATM 130 to display the information thus found.

FIG. 8 illustrates processing wherein, when a clerk chooses a customer to be called up on the counter terminal unit 140, the system server at sales shop 160 retrieves information that the customer previewed on other information processing apparatuses or information on interest of the customer from the customer face image temporary storing table 3000 and the customer information table 4000 and displays such information on the counter terminal unit 140.

First, processing procedures for stages from detection of customer proximity with the information terminal unit 110 to updating of the display content storing table 2000 and the customer face image temporary storing table 3000 will be described with reference to the diagram illustrating a customer face image acquisition flow (information display terminal unit) in FIG. 5.

FIG. 5 shows a processing flow in the information terminal unit 110 and the camera 115 as well as that in the system server at sales shop 160.

It should be noted first that various types of merchandise information are displayed on the information display terminal unit 110.

When a customer who visits the sales shop with an intention for a certain transaction comes in proximity to the information display terminal unit 110, the information display terminal unit 110 detects that the customer comes in proximity within a given distance to the terminal unit or to a given position (Step 501). The detection is made by a human presence detection sensor or the like which is installed in the information display terminal unit 110.

The information display terminal unit 110, when it detects customer proximity, starts acquiring elapsed time after the proximity (Step 502). It should be noted that the time counting can be performed by using a built-in timer. When the customer remains in proximity to the terminal unit for a set length of time or longer, the information display terminal unit 110 detects the status (Step 503) and captures a face image of the customer (Step 504). It should be noted that capturing of a face image may be started instead of using time counting, when an operation is detected on the information display terminal unit 110. In this case, the procedure should be included in which the information display terminal unit 110 starts capturing a face image when merchandise information according to operations by the customer is displayed. In addition, the procedure should be included in which the information display terminal unit 110 displays merchandise information by detecting proximity of a customer or positioning of a customer in a specified position.

Then, the information display terminal unit 110 transmits the face image data of the customer that is captured by the camera 115 and the merchandise information (content data) that is displayed on the information display terminal unit 110 to the sales shop system server 160 (Step 505).

The sales shop system server 160 stores the face image data and the content data that are transmitted from the information display terminal unit 110 in the display content storing table 2000 and the customer face image temporary storing table 3000. Here, the sales shop system server 160 associates a face image number, which is the common identifier for the transmitted face image data and the content data, with both of the data, and stores the respective data in the customer face image temporary storing table 3000 and the display content storing table 2000 (Step 506). With such arrangement, it is possible to store the face image data and the content data in an associated manner. For this purpose, the customer face image temporary storing table 3000 and the display content storing table 2000 may be integrated into one table.

The above description is given of the processing procedures by the information display terminal unit 110 for the stages from detection of customer proximity to updating of the display content storing table 2000 and the customer face image temporary storing table 3000.

Next, processing procedures by the reception terminal unit 120 for stages from detection of customer proximity to updating of the display content storing table 2000 and the customer face image temporary storing table 3000 will be described with reference to the customer face image acquisition flow (reception terminal unit) illustrated in FIG. 6.

FIG. 6 shows processing flows in the reception terminal unit 120 and the camera 125 as well as a processing flow in the sales shop system server 160.

It should be noted that a menu window for reception is displayed on the reception terminal unit 120. When a customer who visits the sales shop with an intention for a certain transaction has made an operation on the reception terminal unit 120, the reception terminal unit 120 detects the operation by the customer (Step 601) and captures a face image of the customer by using the camera 125 (Step 602).

Then, the customer inserts a card owned by the customer when conducting reception by using the reception terminal unit 120. At this time the reception terminal unit 120 checks the card (Step 603). The reception terminal unit 120, when it detects no insertion of the card owned by the customer, combines and transmits the face image data of the customer which was captured by the camera 125 and the merchandise information (content data) that is displayed on the reception terminal unit 120 to the sales shop system server 160 (Step 604).

The face image data and the content data that are transmitted from the reception terminal unit 120 are stored in the display content storing table 2000 and the customer face image temporary storing table 3000 by the sales shop system server 160 (Step 605).

In addition, when it detects insertion of the card owned by the customer, the reception terminal unit 120 combines and transmits the face image data of the customer that was captured by the camera 125, merchandise information (content data) that is currently displayed on the information display terminal unit 110 and the bank account information that is stored on the card to the sales shop system server 160 (Step 606).

The sales shop system server 160 stores the face image data and the content data that are transmitted from the reception terminal unit 120 as well as the bank account information in the display content storing table 2000 and the customer face image temporary storing table 3000 (Step 607). Here, the sales shop system server 160 associates a face image number, which is the common identifier for the transmitted face image data and the content data, with both of the data, and stores the data in the customer face image temporary storing table 3000 and the display content storing table 2000, respectively. With such arrangement, it is possible to store the face image data, the content data and the bank account information in an associated manner. For this purpose, the customer face image temporary storing table 3000 and the display content storing table 2000 may be integrated into one table.

The above description is given of the processing procedures by the reception terminal unit 120 for stages from detection of the customer's operation to updating of the display content storing table 2000 and the customer face image temporary storing table 3000.

The above is the description on processing procedures by the reception terminal unit 120 for stages from detection of the customer's operation to updating of the display content storing table 2000 and the customer face image temporary storing table 3000.

Next, processing procedures by the ATM 130 for stages from detection of the customer's operation and display of the sales window to updating of the display content storing table 2000 and the customer face image temporary storing table 3000 will be described with reference to the sales information display flow (ATM) illustrated in FIG. 7.

FIG. 7 shows a processing flow in the ATM 130 and the camera 135 as well as that in sales shop system server 160.

It should be noted first that a menu window for reception is displayed on the ATM 130. When a customer who visits the sales shop with an intention for a certain transaction operates the ATM 130, the ATM 130 detects the operation by the customer (Step 701) and captures a face image of the customer by using the camera 135 (Step 702), and transmits the face image data of the customer to the sales shop system server 160 (Step 703).

Next, the ATM 130 detects whether or not the customer has inserted the card (Step 704). Note that this card, including, what is called, a cash card, is a card that is used for using services provided by the sales shop concerned and an organization to which other sales shops belong.

When the ATM 130 does not detect insertion of a card in Step 704, the sales shop system server 160 searches the customer face image temporary storing table 3000 for the same face image as the face image data that is transmitted from the ATM 130 (Step 705). Here, the search for the same face image data includes searching for a face image that is judged as the same person. In addition, the search for the same image data may be replaced by searching for a corresponding face image. For example, face images subjected to data conversion including data compression are stored in a customer face image temporary storing table, and corresponding images will be retrieved.

When the sales shop system server 160 does not find a corresponding face image on the customer face image temporary storing table, the ATM displays the next window inducing the customer to execute a subsequent transaction (Step 706).

When it finds the face image entered, from the customer face image temporary storing table 3000 during the retrieval operation in Step 705, the sales shop system server 160 checks whether the bank account number 3400 of the customer associated with the face image that was found from the customer face image temporary storing table 3000 is stored (Step 707).

Further, when the ATM 130 detects insertion of the card in Step 704, the sales shop system server 160 checks whether the bank account number 3400 of the customer stored in the customer face image temporary storing table 3000 exists or not (Step 707). More specifically, the ATM 130 reads the customer's bank account number 3400 recorded on the card, and transmits the bank account number 3400 thus read to the sales shop system server 160. The sales shop system server 160 searches the customer face image temporary storing table 3000 for the bank account number transmitted.

The sales shop system server 160, when the bank account number 3400 does not exist on the customer face image temporary storing table 3000, searches the customer face image temporary storing table 3000 for face image data that corresponds to the customer face image transmitted in Step 703. As a result of this search, the sales shop system server 160 acquires the face image number 3100 thus retrieved and acquires the display content 2200 which corresponds to the face image number 3100 (Step 708).

Upon having acquired the display content 2200 which corresponds to the face image number 3100, the system server at sales shop 160 instructs the ATM 130 to display the display content 2200 as a sales window (Step 709). Further, a general advertisement may be displayed when it is judged that no adequate image data is available in Step 705. For example, general advertisement information related to the sales shop concerned is stored in the display content storing table 2000, while being associated with a face image number 000 (unused number). Then, when it is judged that no adequate image data is available in Step 705, the advertising information will be output. Here, the face image number needs only to be identified as a number used when a judgment is made as "no adequate image available", and it may either be a letter string "no adequate image" or "NULL." In addition, examples of the display content include information other than advertising information such as a video image of landscape and a game. In this case, "000" may be stored in the face image number 3100 on the customer face image temporary storing table 3000, and records of the face image capturing time 3200, the face image 3300 and the bank account No. 3400 which are associated with the face image number 3100, "000", may be stated as "NULL." Further, information that the face image number 3100, "000", is an unused number may be stated in the above-stated records. Furthermore, the embodiment includes the procedure of terminating processing at this stage.

In addition, the system server at sales shop 160, when the bank account number 3400 exists on the customer face image temporary storing table 3000, acquires the information on interest 4200 which corresponds to the bank account number 3400 from the customer information table 4000 (Step 710). The sales shop system server 160 instructs the ATM 130 to display the information on interest 4200 acquired in Step 710 as a sales window (CRM linkage data) (Step 711).

The term "CRM linkage data" used here means information that is associated with information that can identify the customer (a bank account number, etc.), such as the information previewed by the customer inside or outside the sales shop and information that attracted interest of the customer.

The ATM 130, after displaying the sales window (CRM linkage data), detects completion of transaction and transmits the face image of the customer and the transaction that is handled by the customer to the sales shop system server 160 (Step 712).

The sales shop system server 160 stores the customer's face image transmitted from the ATM 130, and the bank account information and the display content contained in the data of transaction handled by the customer in the customer face image temporary storing table 3000 and the display content storing table 2000, respectively (Step 713). Here, the sales shop system server 160 associates a face image number, which is the common identifier for the transmitted face image data and the content data, with both of the data, and stores the data in the customer face image temporary storing table 3000 and the display content storing table 2000, respectively. With such arrangement, it is possible to store the face image data, the bank account data and the content data in an associated manner. For this purpose, the customer face image temporary storing table 3000 and the display content storing table 2000 may be integrated into one table.

The above description is given of the processing procedures by the ATM 130 for stages from detection of customer's operation to updating of the display content storing table 2000 and the customer face image temporary storing table 3000.

Next, a transaction by using the counter terminal unit 140 will be described with reference to the sales information display flow (counter terminal unit) illustrated in FIG. 8. More specifically, processing procedures covering stages from display of a waiting customer list window to display of a sales window will be described.

FIG. 8 illustrates a flow of processing in the counter terminal unit 140 and a flow of processing in the sales shop system server 160.

It should be noted first that a list of customers who have made preliminary transactions by using the information display terminal unit 110, the reception terminal unit 120 and/or the ATM 130 and need transactions with clerks in charge of the counter terminal unit 140 is displayed on the counter terminal unit 140 (Step 801).

More specifically, the sales shop system server 160 receives information on the transaction which is preliminarily input on the reception terminal unit 120 and/or the ATM 130 and transmits the information to the counter terminal unit 140 in accordance with a request from the counter terminal unit 140. Then, the counter terminal unit 140 displays the information.

The counter terminal unit 140, upon detecting that the clerk has selected a customer (or the transaction itself) who executes a transaction according to the list displayed, transmits customer data concerning the customer who is correspond to the selection result to the sales shop system server 160 (Step 802). It should be noted, however, that the customer data needs only to be any data that can identify the face image of the customer and includes a face image number, a bank account number and a face image. In addition, the customer data may be transmitted from the terminal unit at counter 140 according to selection of a customer by the clerk on the displayed list.

The sales shop system server 160 searches the customer face image temporary storing table 3000 for the face image data 3300 by using the customer data (Step 803).

The sales shop system server 160 checks if the bank account number 3400 which corresponds to the face image data 3300 of the customer exists in the customer face image temporary storing table 3000 or the customer information table 4000 (Step 804). More specifically, the sales shop system server 160 searches the customer face image temporary storing table 3000 or the customer information table 4000 for the transmitted customer data as a key.

The system server at sales shop 160, when the adequate bank account number does not exist on the customer face image temporary storing table 3000 (or the customer information table 4000) in Step 804, acquires the face image number 3100 that corresponds to the customer face image temporary storing table 3000. For this purpose, the retrieval result of the face image data in Step 803 may be used. In other words, the sales shop system server 160 acquires the face image number which corresponds to the face image that is retrieved in Step 803. Then, the sales shop system server 160 acquires the display content 2200 which corresponds to the acquired face image number 3100 and the transaction data of the customer from the display content storing table 2000 as the detailed data on the customer (Step 805).

The sales shop system server 160 instructs the counter terminal unit 140 to display the detailed data on the customer as the customer's detailed data and the sales window (Step 806). For example, the sales shop system server 160 may transmit the customer's detailed data to the counter terminal unit 140 for display.

Further, the sales shop system server 160, when the adequate bank account number 3400 of the customer exists on the customer face image temporary storing table 3000 in Step 804, acquires the customer's bank account number 3400 that is adequate for the customer face image temporary storing table 3000 in which data of the customer is stored, and, from the customer information table 4000, acquires the information on interest 4200 which is available on the bank account number 4100 corresponding to the bank account number 3400 of the customer (Step 807).

The sales shop system server 160, upon acquiring the information on interest 4200 corresponding to the bank account number 3400 of the customer, instructs the counter terminal unit 140 to display the information on interest 4200 as the customer's detailed data and the sales window (CRM linkage data) (Step 808). The CRM linkage data used here means data in which the information that is previewed by the customer outside or inside the sales shop, the information that attracts interest of the customer, etc. are stored, as is the case with the CRM data used in the ATM 130.

By instructing the counter terminal unit 140 to display the information as the customer's detailed data and the sales window (CRM linkage data), it is possible for the clerk to execute sales activities by using the customer's detailed data or the CRM linkage data to the customer who is waiting at the lobby of the sales shop.

The above description is given of processing procedures by the counter terminal unit 140 for stages from displaying of a window for list of waiting customers to displaying of the sales window.

It should be noted that the present invention should include the following processing performed when a person other than the principal person such as a family member of the holder of a bank account makes a visit to the sales shop.

In Step 704, the process will advance to Step 705 even when the card is inserted. Further, in a case where the adequate image is available in Step 705, the process will advance to Step 707. In Step 707, a comparison is carried out between the face image data which is contained in the bank account information and the data of face image which is captured in Step 702 (or the face image data that is stored in the customer face image temporary storing table). Then, when the comparison reveals no accordance and the card is inserted, it is controlled to advance the process to Step 708 even if the bank account information is available. With such arrangement, it is possible to present sales information according to visitors when a representative of the customer visits the shop.

Further, the customer's face image may be associated with the bank account number 4100 and the information on interest 4200 and stored on the customer information table 4000 in advance. Here, not only the face image of the customer, but also face images of persons such as family members who are likely to visit the shop on behalf of the customer may be stored on the table. In this case, authentication may be carried out by using the face image that is stored on the customer information table 4000. More specifically, a comparison will be made between a face image that is captured by at least one camera out of the cameras 115, 125 and 135 and the face image stored on the customer information table 4000. As a result, when the face image does not coincide with either of the face image, for example, of the principal customer or a family member of the customer that is stored in advance, the transaction will be suspended, assuming that the person is a fraudulent user. Alternatively, in stead of suspending the transaction, a message telling fraudulent use and the face image (that is captured by the cameras 115, 125 or 135) of the fraudulent user may be displayed on the terminal unit at counter 140.

In the above, the specific description of the present invention has been made based on the preferred embodiments. However, the present invention is not limited to the preferred embodiments stated in the above, and the present invention may be modified in various ways so far as not departing from the scope of the present invention.

What is claimed is:

1. A sales shop system which is connected to an imaging apparatus that captures a face image of a customer visiting a sales shop as biometric-image information and supports a transaction of a commodity in said sales shop, said sales shop comprising:

a first storage device which associates the face image of the customer of said commodity with merchandise information on the merchandise of the customer that is associated with identification information for identifying the customer and stores the face image as biometric-image information and the merchandise information;

a first information processing apparatus which outputs merchandise information on merchandise in accordance with an operation made by the customer who visits said sales shop and inputs the face image of the customer;

a second storage device which associates the face image inputted on said first storage device with said merchandise image and stores the face image as biometric-image information and the merchandise image;

a second information processing apparatus which inputs the face image of said customer as biometric-image information and, when the identification information for identifying said customer is inputted, receives the input of the identification information; and a sales shop apparatus which:

receives said face image that is inputted on said second information processing apparatus and, when the input of said identification information is available, searches said first storage device for merchandise information that is associated with the identification information;

when the input of said identification information is not available, compares said face image received and the face image that is stored in said first storage device, and searches said first storage device for related merchandise information if the face image that corresponds to the face image received is stored in said first storage device, or searches said second storage device for related merchandise information if the face image is not stored in said first storage device; and outputs the merchandise information thus found.

2. A sales shop system according to claim 1, wherein said plurality of information processing apparatuses include an automatic teller machine and a reception terminal unit which receives work tasks to be handled by the sales shop.

3. A sales shop system according to claim 1, wherein said sales shop apparatus transmits the merchandise information concerned to said second information processing apparatus as an output of merchandise information found, and said second information processing apparatus displays said merchandise information transmitted.

4. A sales shop apparatus which outputs information related to a customer who visits a sale shop by establishing connection with a plurality of terminal units, said sales shop apparatus comprising:

means for receiving biometric-image information on the customer who visits the sales shop from a first terminal unit that is included in said plurality of terminal units as first biometric-image information;

means for identifying information in accordance with an operation made by said customer;

means for storing said first biometric-image information thus input and the information that is identified based on the operation made by said customer in an associated manner;

means for receiving a request for processing of information on the customer and the biometric-image information of said customer from a second terminal unit that is included in said plurality of terminal units as second biometric-image information;

means for retrieving the first biometric-image information that is associated with said second biometric-image information; and means for executing processing of information that is associated with said first biometric-image information retrieved and outputting of said identified information.

5. A sales shop apparatus according to claim 4, wherein said biometric-image information includes at least one of the image information of said customer, vein pattern information, fingerprint pattern information and iris recognition information.

6. A sales shop apparatus according to claim 5, wherein said image information is the face image of said customer.

7. A sales shop apparatus according to claim 4, wherein said identifying means identifies, as said information, information relating to information that is displayed on said first terminal unit as a result of the operation made by said customer.

8. A sales shop apparatus according to claim 4, further comprising:

means for storing identification information that identifies a customer and merchandise information relating to the customer in an associated manner; and means, when said first terminal unit accepts the identification information for identifying said customer, for receiving the identification information;

wherein said identifying means, when receiving said identification information, identifies merchandise information corresponding to the received identification information as said information.

9. A sales shop apparatus according to claim 8, wherein said identifying means, when not receiving said identification information, identifies information relating to the information that is displayed on said first terminal unit as a result of the operation made by said customer as said information.

10. A sales shop apparatus according to claim 8, further comprising:

means for storing said identification information and third biometric-image information which is biometric-image information of a customer who is identified by the identification information in an associated manner; and means, when receiving said biometric-image information from said first terminal unit, for comparing said first biometric-image information with said third biometric-image information;

wherein said identifying means, when said comparison revealed that said first biometric-image information is not associated with said third biometric-image information, identifies information that relates to the information displayed on said first terminal unit as a result of the operation made by said customer as said information.

11. A sales shop apparatus according to claim 10, wherein said means for storing said third biometric-image information further stores fourth biometric-image information which is biometric-image information of a person who could be a representative of said customer by associating the fourth biometric-image information with said identification information; and wherein said sales shop apparatus further comprises:

means for comparing said first or said second biometric-image information with said third biometric-image information, and, if the comparison revealed no corresponding, comparing said first or said second biometric-image information with said fourth biometric-image information; and means for suspending a transaction of the customer if said comparison revealed no corresponding.

12. A sales shop apparatus according to claim 4,
wherein said storing means stores information that indicates that said first biometric-image information has not been found by said searching means, and second information in an associated manner, and
said means for executing outputting of said information, when said first biometric-image information has not been found by said searching means, outputs said second information stored.

13. A method for retrieving merchandise information in a sales shop system which is connected to an imaging device which captures a face image of a customer visiting a sales shop as biometric-image information and supports transaction of merchandise in said sales shop, said method comprising the steps of:
associating the face image as biometric-image information of the customer of said merchandise with merchandise information that is associated with the merchandise information on the merchandise of the customer which is identification information for identifying the customer and storing the face image and the merchandise information in a first storage device;
outputting merchandise information on merchandise in accordance with an operation made by a customer visiting said sales shop and inputting a face image of the customer in a first information processing apparatus as biometric-image information;
storing the face image as biometric-image information that is input by said first information processing apparatus and said output merchandise image in a second storage device in an associated manner;
inputting the face image of said customer as biometric-image information and, when an input of identification information for identifying said customer is available, accepting the input of the identification information at a second information processing apparatus;
receiving said face image that is input at said second information processing apparatus as biometric-image information;
when the input of said identification information is available, searching said first storage device for merchandise information that is associated with the identification information;
when the input of said identification information is not available, comparing said face image received and the face image that is stored in said first storage device, and searching said first storage device for related merchandise information if the face image that corresponds to the face image received is stored in said first storage device, or searching said second storage device for related merchandise information if the face image is not stored in said first storage device; and
outputting merchandise information thus found.

14. A method for retrieving merchandise information according to claim 13,
wherein said plurality of information processing apparatuses include an automatic teller machine and a reception terminal unit which receives work tasks to be handled by the sales shop.

15. A method for retrieving merchandise information according to claim 13,
wherein said sales shop apparatus transmits the merchandise information to said second information processing apparatus as an output of retrieved merchandise information, and
said second information processing apparatus displays said merchandise information transmitted.

* * * * *